United States Patent [19]

Bernstein et al.

[11] Patent Number: 4,682,755
[45] Date of Patent: Jul. 28, 1987

[54] MECHANICAL CONTROL SYSTEM IN FLOW DEVICES

[75] Inventors: Robert E. Bernstein, Framingham; Alan E. Nelson, Franklin, both of Mass.

[73] Assignee: Larad Equipment Corporation, Medfield, Mass.

[21] Appl. No.: 822,038

[22] Filed: Jan. 24, 1986

Related U.S. Application Data

[63] Continuation-in-part of Ser. No. 769,783, Aug. 23, 1985, Pat. No. 4,630,635, which is a continuation of Ser. No. 441,613, Feb. 11, 1983, abandoned.

[51] Int. Cl.4 .................... F16K 31/524; F16L 55/14
[52] U.S. Cl. ........................................... 251/4; 251/5; 251/7; 251/252; 251/284; 251/292
[58] Field of Search ................ 251/4, 5, 7, 9, 251, 251/252, 284, 286, 291, 292

[56] References Cited

U.S. PATENT DOCUMENTS

| | | | |
|---|---|---|---|
| 2,112,592 | 3/1938 | MacClatchie | 251/4 |
| 2,842,331 | 7/1958 | Anderson | 251/9 |
| 3,197,173 | 7/1965 | Taubenheim | 251/7 |
| 3,982,723 | 9/1976 | Ford et al. | 251/5 |
| 4,029,120 | 6/1977 | Christianson | 251/251 |
| 4,073,467 | 2/1978 | Little et al. | 251/7 |
| 4,193,579 | 3/1980 | Massey | 251/292 |
| 4,322,054 | 3/1982 | Campbell | 251/5 |
| 4,372,345 | 2/1983 | Mehus | 251/5 |
| 4,572,239 | 2/1986 | Koch et al. | 251/286 |

Primary Examiner—Martin P. Schwadron
Assistant Examiner—Sheri M. Novack
Attorney, Agent, or Firm—Neuman, Williams, Anderson & Olson

[57] ABSTRACT

A pinch valve includes a housing with a quarter-turn closure mechanism disposed within the housing for adjustment of a spool-sleeve. The mechanism consists of two cam members rotatably supported in the housing on the opposite sides of the sleeve and connected to a hub via drive links. The hub is disposed proximate an opening in the housing and is rotated manually by a handle, or automatically by an actuator. Each cam member includes a first portion which is rotatable across the sleeve and a shank portion which is eccentrically disposed on the first portion and traverses the sleeve profile. As the cam members are rotated the shank portions move transversely of the sleeve longitudinal axis, toward and away from one another for pinching the sleeve and thereby selectively throttling or stopping the flow through the system. When rotated to a fully retracted or release position, the shank portions are completely withdrawn from the outside profile projection of the sleeve, whereby the sleeve can be removed axially from the housing. The pinch valve also may have motive fluid means for pinching the sleeve.

24 Claims, 15 Drawing Figures

MECHANICAL CONTROL SYSTEM IN FLOW DEVICES

BACKGROUND OF THE INVENTION

This application is a continuation-in-part of our co-pending application Ser. No. 769,783, filed Aug. 23, 1985, now Pat. No. 4,630,635 which in turn is a continuation of our now abandoned application Ser. No. 441,613 with a filing date of Feb. 11, 1983.

FIELD OF THE INVENTION

This invention relates to flow devices with elastomeric sleeves, such as pinch valves, for regulating, measuring, throttling or stopping the flow of a fluid.

DESCRIPTION OF THE PRIOR ART

Flow devices with elastomeric sleeves are commonly used in the chemical process industry, food industry, mining, metallurgy, plating and indeed in any industry where liquids containing solids, such as slurries, and other hard-to-handle fluids and even solids are made to flow. Pinch valve devices which include such sleeves are used for both on/off and flow control situations. The general distinctions and advantages of pinch valves over other types of valves are well known and recognized.

The basic construction of a pinch valve consists of a flexible resilient elastomeric sleeve installed in a fluid process line together with means to constrict the sleeve so as to regulate, throttle or terminate the flow of the fluid through the line. Some pinch valves employ a mechanical pinch mechanism to constrict the sleeve. One type of pinch valve manufactured today consists of a flanged elastomeric sleeve in which the sleeve is fitted either into a one-piece housing (by distorting the elastomer flange and pushing the sleeve into the housing) or more commonly, in a split housing with its associated sealing gaskets and bolts. The sleeve flange is outside the housing and is sandwiched between flanges on the housing and the line piping and serves to seal the valve against leakage of process fluids. Where adjustment of the valve is by a motive fluid, for example air or hydraulic fluid, which squeezes the intermediate portion of the sleeve, the flange also serves to seal the motive fluid.

Problems with reliability, leakage, ease and speed of installation and repair, verification of operability, cost and complexity of the valve have long been the subject of pinch valve design efforts. In said application Ser. No. 769,783, we disclosed a flow device which overcame the foregoing problems associated with prior art pinch valves which employ a motive fluid to restrict fluid flow. The present invention concerns the improvement of flow devices where a mechanical closure device operates to adjust the valve.

Pinch valves employing mechanical closure systems involve problems similar to conventional pinch valves employing a motive fluid. For example, the valve housing must be opened in order to remove and replace a damaged sleeve. In addition, pinch valves employing mechanical closure systems require at least partial disassembly of the mechanical closure component, which is a time-consuming and intricate process.

Multi-turn pinch valves employing a mechanical closure system which acts on the sleeve have further drawbacks. First, closing a manual multi-turn valve is a slow process which can be detrimental, especially in an emergency. Moreover, the rangeability of such valves are usually only in the 4 to 1 to 10 to 1 range, with highly throttled valves causing significant hydraulic noise.

SUMMARY OF THE INVENTION

The present invention is an improved flow device with an elastomeric sleeve and a mechanical closure system which allows fast, easy installation of the sleeve in the housing, and of the sleeve-housing assembly into the piping system. The mechanical closure system of the present invention includes a pinch cam and drive arrangement which recesses within the valve housing to permit removal and replacement of a sleeve without disassembly of the mechanical closure system.

The mechanical closure device of the present invention also provides a high response ratio and permits variable ratio closing in a quarter-turn of an operating handle. The valve design further permits actuation of the sleeve alternatively with motive fluid.

The mechanical closure system is advantageously and preferably embodied in combination with the sleeve disclosed in said application Ser. No. 769,783. Such an embodiment permits proof testing prior to installation into the piping system. In addition, it is possible to open and alter the downstream piping, disconnecting the downstream side of the valve, while the valve is in the OFF position in the pipe system.

In one embodiment of the present invention, a pinch valve includes a housing with a quarter-turn closure mechanism disposed within the housing for adjustment of a spool-sleeve. The mechanism consists of two cam members rotatably supported in the housing on the opposite sides of the sleeve and connected to a hub via drive links. The hub is disposed proximate an opening in the housing and is rotated manually by a handle, or automatically by an actuator. Each cam member includes a first portion which is rotatable across the sleeve and a shank portion which is eccentrically disposed on the first portion and traverses the sleeve profile. As the cam members are rotated the shank portions move transversely of the sleeve longitudinal axis, toward and away from one another for pinching the sleeve and thereby selectively throttling or stopping the flow through the system. When rotated to a fully retracted or release position, the shank portions are completely withdrawn from the outside profile projection of the sleeve, whereby the sleeve can be removed axially from the housing. The pinch valve also may have motive fluid means for pinching the sleeve.

DETAILED DESCRIPTION OF THE PREFERRED EMBODIMENTS

Figures 1, 3, 4:
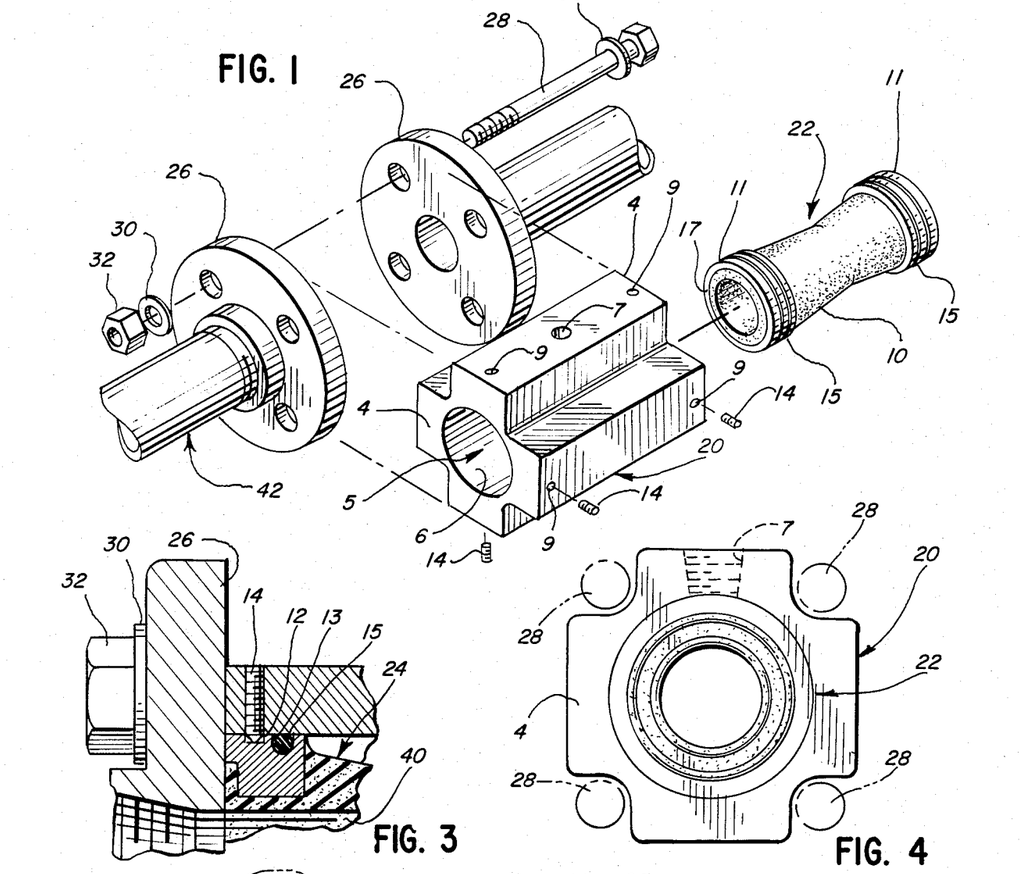
FIG. 1 is an exploded perspective view of a pinch valve flow device employing teachings of the invention disclosed in said application Ser. No. 769,783.
FIG. 3 is a magnified view of a portion of FIG. 2 with the end seal beads compressed by the connecting flange of the system.
FIG. 4 is an end view of the pinch valve of FIG. 1, with the connecting bolts in phantom.
Figure 2:
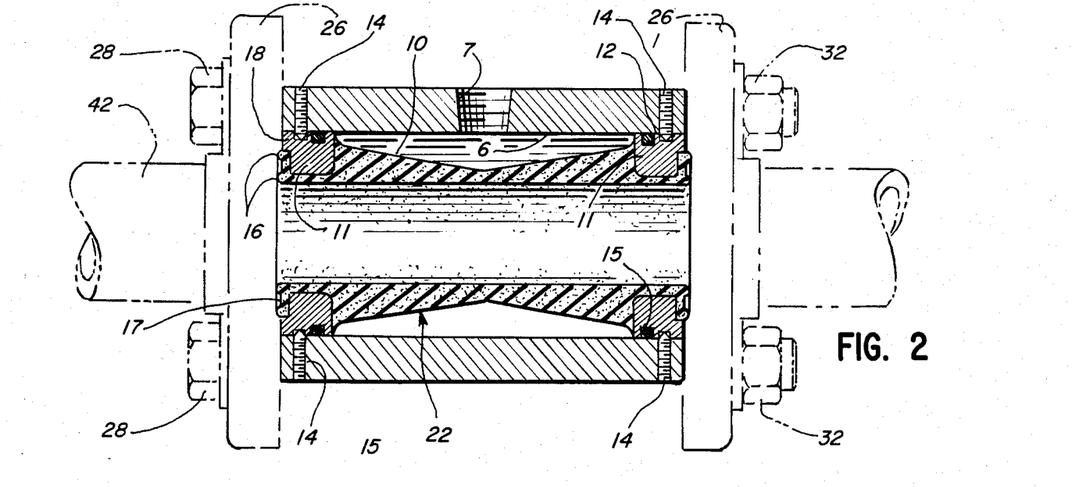
FIG. 2 is a longitudinal section view of the pinch valve of FIG. 1, with connecting elements illustrated in phantom lines.

Referring to FIGS. 1-4, one embodiment of the flow device disclosed in said application Ser. No. 769,783 is shown. The flow device is described in greater detail in the aforementioned application. However, for purposes of convenience and ease of understanding the present invention, this prior flow device will be generally described herein. Turning to FIGS. 1 and 2, the illustrated flow device has a housing 20, and a spool sleeve assembly 22. Flanges 26, bolts 28, washers 30 and nuts 32 are used for mounting of the device in a pipe system.

The housing 20 is of a general cruciform external configuration, being notched at each corner to accommodate installation bolts 28. The housing 20 has end faces 4, an axial bore or chamber 5 defined by an interior wall 6, a centrally located threaded passage 7 through the wall and communicating with the chamber 5 for a motive fluid connection, and a series of threaded holes 9 extending radially through the wall of housing 20 and located evenly distributed peripherally around it near the end faces 4. Four such threaded holes, located 90 degrees apart at each end, are exemplary.

The spool-sleeve assembly 22 best seen in FIG. 1 and FIG. 3 comprises a resilient flexible elastomeric sleeve portion 10, for containing and controlling process fluid flowing through the valve, and rigid end ring portions 11. Each end ring portion 11 has an outerperipheral retaining groove 12 and a sealing groove 13. The retaining groove 12 receives the ends of set screws 14 which are screwed into the threaded holes 9, four at each end of the assembly. An 0-ring 15 is fitted into each sealing groove 13 and seals against the interior wall 6 of the housing 20. Two annular beads 16 are formed on each end face 17 of the spool-sleeve assembly 22. Beads 16 are backed up by the rigid end ring portions 11 held by the set screws 14 so that when the beads 16 are compressed as explained below, the sealing effect is highly effective. Also a shoulder of each end ring portion 11 extends to and is part of end face 17, at 18. However, this shoulder is not necessary; instead the elastomeric material could extend to the outer periphery. The spool sleeve assembly 22 is made to be effectively flush at each end with the end faces 4 of the housing 20, although the bead 16 extends beyond the end face 4 so that it can compress and seal as described below. By the term "effectively flush" it is not meant to imply exact co-termination, but rather that the housing and sleeve assembly may be installed in and removed from a piping system by sideways movement without specific disassembly of any part of the piping system. It is contemplated that slight extension of the sleeve beyond the housing or vice versa would still permit the easy installation and removal contemplated by this invention.

Flanges 26 provide spaced parallel connector surfaces. They may be typical pipe flanges suitably attached to the pipe system in a normal manner, as by threaded or welded connections, and may be a permanent part of a pipe system. The bolts 28 span the valve device and the respective flanges 26, accommodated by the corner notches of the housing 20 as seen in FIG. 4.

As most clearly shown in FIG. 3, when fully installed and in operation in pipe line 42, process fluid 40 flows through the pinch valve. The flanges 26 are shown in phantom lines in FIG. 2 with the beads uncompressed. However, when the device is actually installed, the nuts 32 are tightened on bolts 28 to force the flanges 26 against the end faces of the valve device, thereby compressing the beads 16 into sealing engagement with the respective opposing surface of the flanges 26, e.g., as in FIG. 3. To control flow of the process fluid, a motive fluid, commonly compressed air or hydraulic fluid, fills the actuating space between the wall 6 of housing 20 and the outside of the sleeve portion 10, and is pressurized by an actuating mechanism acting through a suitable conduit connected to passage 7. The pressure squeezes or pinches the sleeve portion 10, restricting or stopping flow. Means for controlling the pressure of the motive fluid are not shown as such means are commonly known by those practicing in this field. The motive fluid is sealed against leakage by the O-rings 15 bearing against the interior wall 6 of the housing 20.

An alternate method of actuating is to store a motive fluid preferably a hydraulic fluid in the actuating space and use a piston or plug in a cylinder, to pressurize the fluid pinching the sleeve. The plug or piston can be moved by a mechanical means such as a quarter-turn mechanism.

The replacement of a spool sleeve in the assembly of FIGS. 1-4 is accomplished by disconnecting the air or hydraulic fluid supply, removing nuts 32 and bolts 28, and sliding the housing 20 sideways, off the line. Then the spool-sleeve assembly 10 is removed from either end of the housing, after first retracting the set screws 14. A new spool sleeve assembly is inserted into the housing (we recommend a light lubricant on the 0-rings) and the set-screws 14 screwed down. At this point operability of the valve can be verified by connecting the air or hydraulic fluid supply and operating the motive fluid, since the O-ring seal is independent of and does not require the valve being mounted in the process line. The set screws 14 prevent movement of the end ring portions 11 during such off-line testing. If operation is verified, the valve is then placed in the line, and the flanges 26 tightened to seal the process fluid.

FIGS. 5-13 show a pinch valve flow device 118 of this invention which may be actuated either by a motive fluid or by a mechanical closure mechanism which acts directly on the sleeve. The pinch valve 118 includes a hollow housing 120, a spool-sleeve 122, and a closure or pinch mechanism 124. The illustrated preferred embodiment 118 includes a removable elastomeric spool-sleeve 122 substantially identical to the spool-sleeve 22 shown in FIG. 1 and which effects sealing cooperation with the housing and the piping components with which the device 118 is joined as previously described. However, the improvements of this valve actuation system may be used in pinch valve devices with other spool-sleeves.

Figures 5, 6, 7, 8, 9, 10, 11:
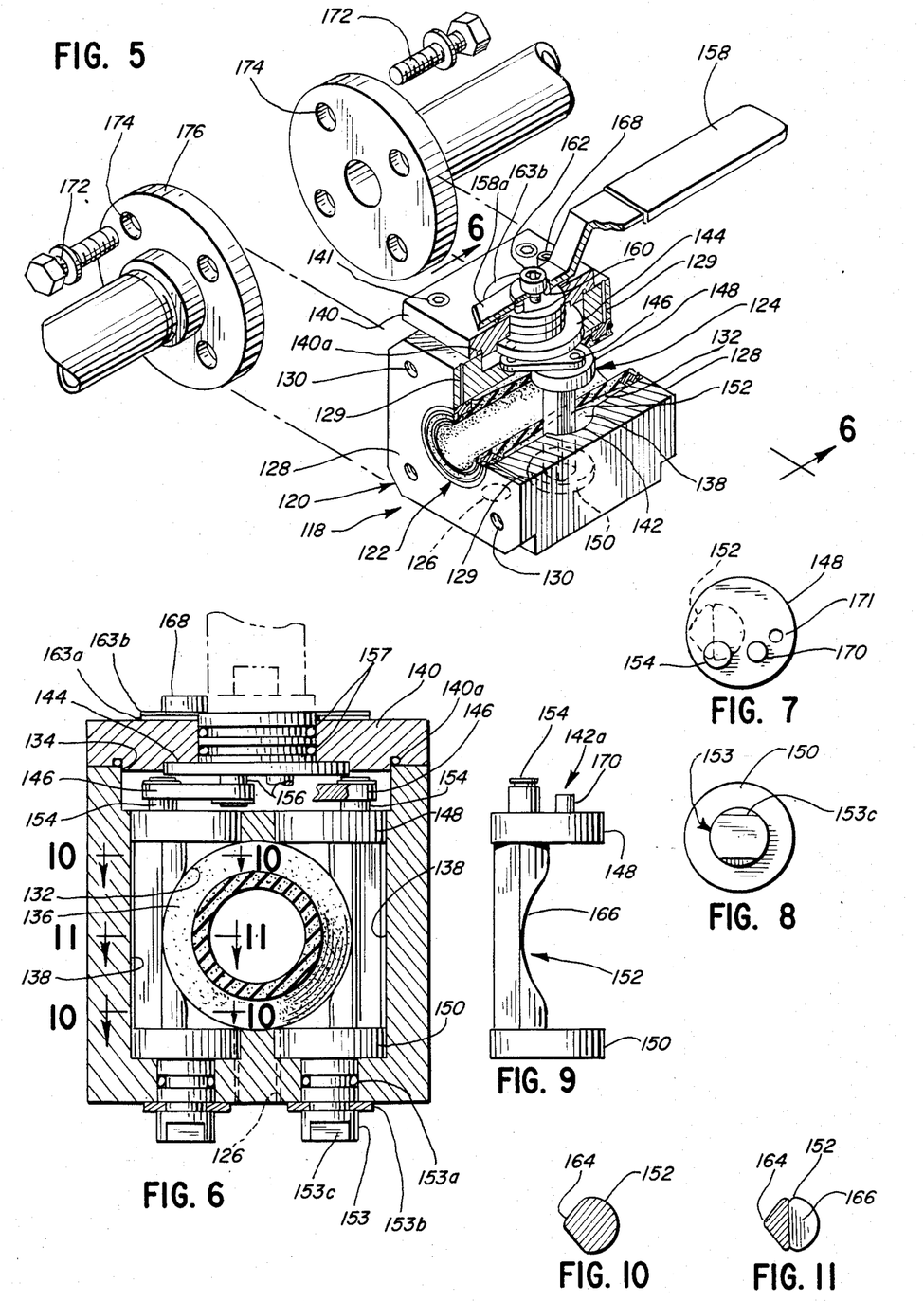
FIG. 5 is an exploded, perspective view of a dual operation pinch valve flow device employing teachings of this invention with manual quarter-turn mechanical actuation and automatic motive fluid actuation.
FIG. 6 is center cross-sectional view of the device of FIG. 5, e.g., taken generally along line 6—6 of FIG. 5.
FIGS. 7 and 8 are top and bottom views, respectively, of a pinch cam member of the device of FIG. 5.
FIG. 9 is a side view of a pinch cam member, without an end lug.
FIGS. 10 and 11 are cross-sectional views of a pinch cam member of the device of FIG. 5, taken along sections 10 and 11, respectively, of FIG. 6.

The hollow housing 120 has a threaded opening 126 for a motive fluid connection, end faces 128, threaded openings 130 in the end faces 128 for attachment of connecting flanges, a series of threaded holes 129 for set screws to secure the spool-sleeve 122, an interior wall 132, and a central top opening 134. The interior wall 132 defines a horizontal, generally cylindrical chamber 136 and two vertical partially-cylindrical side recesses 138. The recesses 138 are centrally located in the housing 120 at opposite sides of the cylindrical chamber 136 and intersect that chamber. The opening 134 communicates with the chamber and recesses 136/138 for insertion and operation of the activating mechanism. The housing also includes a top plate 140 over the opening 134. An O-ring 140a provides a seal between the plate 140 and the main housing body when the plate is secured by cap screws 141.

The mechanism 124 includes two rotatable cam pinch members 142 connected to a rotatable hub 144 by connecting links 146. The pinch members each includes a top circular portion 148, a bottom circular portion 150 and a cam shank portion 152 which is eccentric to the top and bottom portions. The top and bottom portions are rotatably confined in circular recesses in the housing above and below the sleeve. The shank portion extends between the top and bottom portions, beside the sleeve. Each pinch member may include a lug 153 which extends through an aperture in the bottom of the housing 120, with an O-ring seal 153a and retainer clip 153b each engaging a groove in the lug. A flattened portion 153c extends below the housing, for purposes to be noted below.

The hub 144 includes a lower annular flange portion. The respective link 146 for each pinch member is pivotally attached at one end to the top portion 148 of the member 142 by a link pin 154. Each link 146 also is pivotally attached at its other end to the flange portion of the hub 144 by a link pin 156. The link pins 156 are located 180 degrees apart on the flange portion of the hub 144. The central portion of the hub extends through the top plate 140 and receives a pair of O-rings 157 to form a seal between the hub 144 and the top plate 140 to seal the motive fluid in the actuating chamber between the sleeve 122 and the housing 120.

A handle 158 is removably attached to the top of the hub 144 for rotating the hub to actuate the mechanism 124. The illustrated attachment is by two spaced pins 160 and a cap screw 162. Rotational movement of the handle 158 about the axis of the hub causes rotation of the hub 144 which in turn drives the links 146 and causes the rotation of the members 142. Rotation of the members 142 effects the simultaneous movement of the two cam shank portions 152 to pinch and unpinch the sleeve 122. A bowed compression spring washer 163a and a bearing washer 163b are provided between the top plate 140 and the parallel portion 158a of the handle, around hub 144, to provide frictional retention of the mechanism in any selected position of adjustment of the handle. This avoids the valve being forced open by internal process flow pressure.

Figures 12, 13, 14, 15:
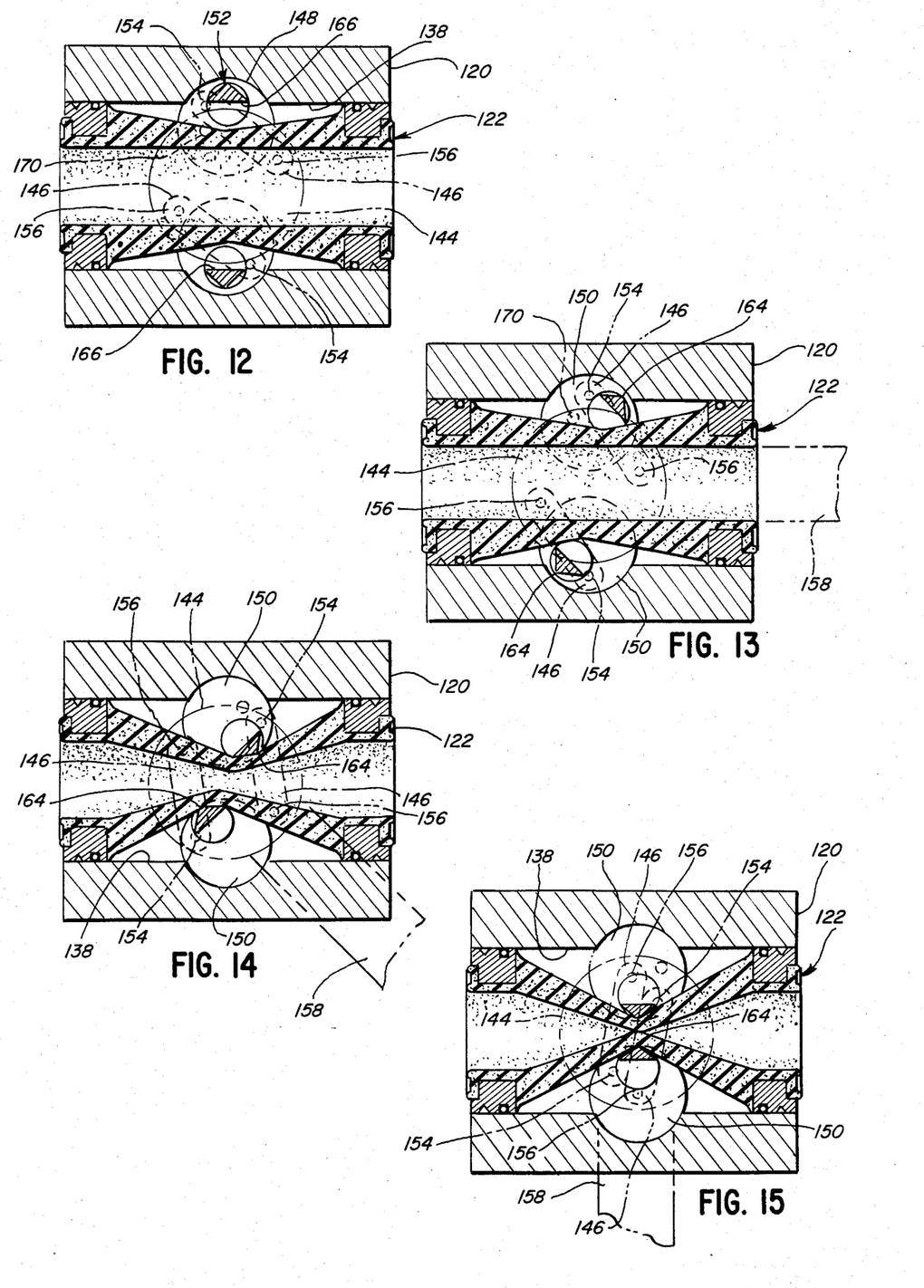
FIG. 12 is a schematic plan view partially in cross-section of the device of FIG. 5 in the sleeve release position.
FIG. 13 is a schematic plan view partially in cross-section of the device of FIG. 5 in the normal fully open position of the mechanism.
FIG. 14 is a schematic plan view partially in cross-section of the device of FIG. 5 in one throttling position of the mechanism.
FIG. 15 is a schematic plan view partially in cross-section of the device of FIG. 5 in the closed position of the mechanism.

FIGS. 12–15 illustrate the operation of the mechanism 124. The configuration of the cam shank portions 152 also is illustrated in FIGS. 6–10. FIG. 13 shows the handle and related mechanism in the open operating position, where the shank portions 152 are adjacent or in contact with the sleeve 122 but are not constricting the sleeve. As the handle is rotated from its position of FIG. 13 (clockwise as shown in the drawings), the cam shanks pinch the sleeve to progressively constrict the flow passage through the sleeve and thereby throttle the process flow. FIG. 14 shows the handle 158 in one throttling position where the shank portions 152 are constricting the sleeve 122. FIG. 15 shows the handle 158 in the closed position, 90 degrees from the open position, where the shank portions 152 have fully constricted the sleeve 122 to close the valve.

The action of the cams on the sleeve, as shown in FIGS. 13–15, is such that closure is effected from two sides of the sleeve simultaneously, with one cam closing from left-to-right, the other from right-to-left, to the centerline or central axis of the sleeve. This method yields a balanced stress on the sleeve and generates a two-orifice valve which in effect spreads the valve pressure drop over two sections, lowering noise and resulting in more precise flow control. Also, the pinch elements move in opposite directions axially of the sleeve, thereby minimizing the net tension effect on the sleeve by these elements during their pinching engagement with the sleeve. Should the elastomer sleeve become worn or permanently set, the sleeve can easily be turned in the housing to extend the useful life of the sleeve.

The drive mechanism provides an inherent control valve characteristic which approximates an equal percentage profile.

Two aspects of the pinching and release actuation of the pinch mechanism 124 may be noted. The top and bottom portions 148 and 150 move the eccentrically mounted shank portions 152 along arcuate paths which describe circles about the fixed center axes of rotation of the pinch members 142. These circular paths traverse the sleeve such that the shanks move generally normal to the longitudinal axis of the sleeve as they begin their pinching movement as in FIG. 13 and then gradually change direction (e.g. as in FIG. 14) until they move generally parallel or asymptotic to the longitudinal center axis of the sleeve at the fully closed position of FIG. 15.

When constricting the sleeve 10 by pinching between the two opposing cams, the initial inward movement of the cams 152 is thus much greater, relative to the angular movement of the drive portions 148 and 150, than later inward movement which gradually reduces and approaches zero at the fully closed position of FIG. 15. This change of pinching action relative to movement of the drive portions approximates equal percentage changes in the flow rate through the sleeve for equal increments of movement of the drive portions throughout the throttling and closing actuation.

The latter characteristic is further enhanced by the illustrated drive linkage and particularly by the relative locations of the pivot pins of the links and the relative positions of the cams. The linkage provides a variable ratio rotary drive to the members 142 relative to the rotation of the hub 144 by the handle 148.

Initial movement of both pins 154 and pins 156 are essentially parallel and colinear with the respective link 146, e.g., in the position of FIG. 13, whereby the incremental linear movements are approximately equal for the pins 154 and 156. However, the radius of the path of pins 156 substantially exceeds the radii of the paths of the pins 154. Thus, the initial incremental movement of the pins 156 along a relatively large radius of hub 144 causes correspondingly larger angular movement of the pinch members 142, with essentially equal corresponding transverse inward movement of the two cam members. However, as the closure movement of the mechanism continues, each link 146 approaches a radius of the hub 144. The incremental movement of each pin 154 relative to the incremental movement of the respective pin 156 correspondingly approaches zero, i.e., at the point where the pin 156 moves at a right angle to the link 146 and the link simply pivots on its pin 154. The relative incremental angular movement of the cams is correspondingly reduced relative to the movement of the hub. As noted above, the movement of the cams in a direction transverse to the sleeve simultaneously approaches zero at their opposing tangent positions illustrated in the closed position of FIG. 15. The links 146 abut one another at this point (FIG. 15), with the front pinch edges 164 of the shanks 152 centered and the linkage not yet centered, to assure positioning of the cams in the fully closed position.

Thus the variable drive ratio of the linkage between the handle and the members 142 causes a further variation in the transverse movement of the shanks 152 relative to the control drive imput, in addition to the vibration which is provided by the arcuate configuration and location of the paths of movement of the cam shanks. Each aspect causes transverse movement which is rapid near the open position of FIG. 13 with graduated reduction through the stroke to the closed position of FIG. 15, and vice versa.

These aspects of the pinching and release activation mechanism result in a fast acting valve actuator within a quarter-turn of the handle, with continuous throttling from 0° (open) to 90° (closed), and approximately equal percentage change in flow rate for equal increments of angular movement of the handle from the fully open position of FIG. 13 to the fully closed position of FIG. 15, all in a compact lightweight system. They also provide increasing force amplification as the sleeve is pinched to the closed position and insure that the closed valve will remain closed with little or no retention force.

It will be seen that in the illustrated embodiment, the cam shanks remain adjacent the sleeve and thus project into the sleeve cavity even when the valve is fully open, overlapping the projected cross-section of the end rings 10, e.g., as in FIG. 13. This avoids any dead band in the handle movement relative to affecting flow rate. This projection would interfere with axial removal and replacement of the sleeve. However, the shanks may be further retracted to the position of FIG. 12 for such removal and replacement purposes. In this spool-sleeve release position, the shank portions 152 are withdrawn from the path of the sleeve, e.g., outside of the cylindrical chamber 136 and held in the recesses 138. As best shown in FIGS. 6 and 9–11, each shank portion 152 narrows in width from both ends to the center such that the profile of the somewhat V-shaped front side 164 is straight and the profile of the back side 166 is concave. When the handle is in the spool-sleeve release position, the shank portions completely withdraw into the recesses 138. The back side then faces and mates or conforms generally with the cylindrical chamber 136 and thereby provides clearance for movement of an end ring 11 through the chamber in the removal and replacement of the spool-sleeve 122. Thus, in this position, the spool-sleeve 122 may be removed axially from the housing 120 and replaced without disassembling the mechanism 124, in the manner referred to above with respect to FIGS. 1–4. Pinch members of other configurations may be used, e.g., eccentric cam shanks of circular cross-section, and the drive mechanism may be varied provided that the actuation system retracts the pinch members from the projected spool-sleeve profile where axial removal of the spool-sleeve is contemplated.

Because the illustrated drive linkage is at or near another dead-center position at the release position as seen in FIG. 12, three provisions are made. First, a stop pin 168 is provided to limit movement of the handle 158 to the fully open position of FIG. 13 and prevent inadvertent movement of the mechanism thereby to a dead-center or over-center-reversal situation. This pin preferably is integral with the top plate 140, but may be removable. Second, means are provided to permit deliberate movement to the release position. This is accomplished in the illustrated mechanism by making the handle removable, to avoid the limit of the stop pin, and providing the lugs 153 for convenient but deliberate rotation of the cams to and from the linkage position of FIG. 12. Third, stop pins 170 are provided on the top portions 148 to abut the links 146 at the release position to preclude over-travel. At the opposite extreme, i.e., the closed position of FIG. 15, the links abut one another as a limit stop. Thus, the linkage utilizes nearly 180° of rotation of the cams while obtaining full control valving operation, that is substantially equal percentage change for equal percentage of movement of the handle, from fully open to fully closed through 90° of travel of the operating handle.

It will be appreciated that the arcuate path movement of the pinch elements may be obtained by other mounting and drive arrangements. For example, the pinch elements may be mounted on links which are rotatable about pivot mountings on or within the valve housing, e.g. corresponding generally to a radial segment of the end portions 148 and 150. Also, the drive elements may be driven by other means, such as by meshing gears attached to the hub and to the drive elements 150 or other suitable gear transmissions between any automatic or manual actuator control input, e.g. the handle 158, and the rotary drive elements. A simple gear drive would retain the benefits of the arcuate path movement of the pinch elements but would not provide the added variation attained by the illustrated linkage drive.

The top portions 148 of members 142 also may be formed with pressure relief passages 171 therethrough (see FIG. 7). Such passages minimize any tendency of pressure surges in the valve chamber to lift or bind the actuation mechanism when using motive fluid to actuate the spool sleeve. Alternatively, by omitting such holes and providing O-ring seals around the portions 148 the motive fluid space may be sealed at this point and thereby remove the actuation link area from the motive fluid.

The retention clips 153b also retain the pinch members 142 in position, when pinch members with the lugs 153 are used. Such lugs may be omitted, as in the pinch member 142A of FIG. 9, when the actuation system otherwise permits movement of the pinch members to and from the release position, e.g. by making stop pin 168 removable. However, with lugs 153 the cams can always be operated directly, external to the valve housing. The cams can always be moved out of the spool release position to operate the valve. Thus, if the valve is mistakenly installed in the process line without the handle affixed, the cams can be moved to the 0° position and the handle affixed, while process fluid is flowing through the valve. The valve opening can also be modulated, if needed, without the handle in place, by turning the cam protrusions.

The pinch valve 118 is connected to the pipe system by screwing threaded bolts 172 through holes 174 of flanges 176 and into the threaded wells 130 of the housing 120 which serves as a tension member. Tightening the bolts 172 presses the sealing bead of the spool-sleeve 122 into sealing engagement with an opposing surface of the flange 170. This illustrates one alternative mode of connecting the subject flow devices, and any suitable alternatives may be used with the valve device 118.

Since the valve 118 has a totally sealed space around the sleeve, it can also be actuated via a motive fluid, directly, as in the embodiment of FIGS. 1-4, producing a dual function valve. The dual mode or dual function allows the valve to be manually throttled in the piping installation while offering an automatic close-off with motive fluid, from a remote station. When motive fluid is relieved, the valve opens to the throttled position. Also, should the valve be operated only with motive fluid, and should motive fluid pressure fail, the valve can be quickly shut off with a 90-degree turn of a handle.

The components of the illustrated flow device may be formed of any suitable materials. For example, the housing may be of metal, such as aluminum, or engineering plastic, such as epoxy, and may be cast, molded or machined. The sleeve may be of any suitable elastomer, including both natural rubber, silicones and other synthetic materials, and may be reinforced with fabric and/or lined with other materials suitable to the particular flow materials, motive fluid and use.

It will be appreciated that, although a specific embodiment has been illustrated and described in detail by way of example, various modifications may be made without departing from the spirit and scope of the invention. Accordingly, the invention is not to be limited to the embodiment illustrated and described herein.

What is claimed is:

1. A pinch valve for use in a conduit system comprising:
    a hollow housing having openings at opposite ends;
    an elongated sleeve disposed inside said housing and defining a fluid flow path, said sleeve having a longitudinal axis generally parallel to such fluid flow path; and
    a mechanical valve actuating device, said device including a first pinch member and a second pinch member, said pinch members disposed within said housing at opposite sides of said sleeve, at least of said pinch members including a rotatable drive element and a shank, said rotatable drive element being rotatable about an axis of rotation which is transverse to and offset laterally from said longitudinal axis, said shank being disposed beside said sleeve and eccentrically attached to the respective drive element for movement transverse to said sleeve along an arcuate path as that drive element is rotated for pinching and releasing the sleeve; said one of said pinch members being mounted such that said shank moves generally normal to said sleeve as it begins pinching of said sleeve and then along such an arcuate path which becomes generally parallel to the axis of said sleeve as the sleeve is closed thereby;
    whereby the transverse pinching movement of said shank decreases relative to the rotational movement of said drive element as said sleeve is pinched by said one of said pinch members.

2. The apparatus of claim 1 wherein said rotatable drive element and said shank are disposed such that said generally parallel portion of said path is adjacent the center axis of said sleeve.

3. The apparatus as in claim 1 wherein said rotatable drive element has a center of rotation which is fixed relative to said housing.

4. The apparatus as in claim 1 including an actuator which is movable for driving said valve actuating device, and a drive linkage means connecting said actuator with said rotatable drive element for rotational movement thereof which decreases relative to the movement of said actuator as said shank moves inward of said sleeve along said path.

5. A pinch valve for use in a conduit system comprising:
    a hollow housing having openings at opposite ends;
    an elongated flexible sleeve disposed inside said housing and defining a fluid flow path, said sleeve having a longitudinal axis generally parallel to such fluid flow path; and
    a mechanical valve actuating device, said device including a first pinch member and a second pinch member, said pinch members disposed within said housing at opposite sides of said sleeve, each of said pinch members including a rotatable drive element and a shank, said rotatable drive element being rotatable about an axis of rotation which is transverse to and offset laterally from said longitudinal axis, said shank being disposed beside said sleeve and eccentrically attached to the respective drive element for movement transverse to said sleeve along an arcuate path as that drive element is rotated for pinching and releasing the sleeve; each of said pinch members being mounted such that said shank thereof moves generally normal to said sleeve as it begins pinching of said sleeve and then along such as arcuate path which becomes generally parallel to the axis of said sleeve as the sleeve is closed by rotation of said drive elements;
    whereby the transverse pinching movement of each of said shanks decreases relative to the rotational movement of the respective drive element as said sleeve is pinched by said pinch members.

6. The apparatus of claim 5 wherein said rotatable drive elements and said shanks thereon are disposed such that said generally parallel portions of said paths of said shanks are adjacent the center axis of said sleeve and opposed to one another.

7. The apparatus as in claim 5 wherein each of said rotatable drive elements has a center of rotation which is fixed relative to said housing.

8. The apparatus as in claim 5 including an actuator which is movable for driving said valve actuating device, and a drive linkage means connecting said actuator with each of said rotatable drive elements for rotational movement thereof which decreases relative to the movement of said actuator as said shanks move inward of said sleeve along said paths.

9. The apparatus as in claim 5 wherein said pinch members are constructed and arranged such that the path of movement of each of said shanks as the respective drive element is rotated includes a portion in which the shank is retracted from the cross-sectional profile of said sleeve.

10. An apparatus for actuating a pinch valve which includes a sleeve within a housing, said apparatus comprising:
   a first cam member having a rotatable drive portion, and a second cam member having a rotatable drive portion, said cam members including cam sections disposed within said housing at opposite sides of said sleeve and eccentrically attached to said drive portions for movement transverse to said sleeve as said drive portions are rotated to pinch said sleeve therebetween; a hub element disposed at one side of said housing; means for rotating said hub; a first link having two ends, one end pivotably mounted to said drive portion of the first cam member and one end pivotably mounted on said hub; and a second link having two ends, one end pivotably mounted to said drive portion of said second cam member and one end pivotably mounted on said hub; whereby rotation of said hub drives the links which cause the cam members to rotate thereby providing movement of said cam sections transverse to said sleeve for the opening and closing of said valve.

11. The apparatus of claim 10 wherein the width of the cam shank portion of each cam member decreases from the opposite ends to the middle of the cam member.

12. The apparatus of claim 10 wherein said cam members each comprise a top portion, a bottom portion, and a cam shank portion having opposite ends and a center, said top portion and bottom portion fixedly attached to said shank portion at the opposite ends.

13. A pinch valve for use in a conduit system comprising:
   a hollow housing having openings at opposite ends and a transverse opening;
   an elongated flexible sleeve disposed inside said housing and defining an actuating space between said sleeve exterior and the interior of the housing and further defining a fluid flow path within said sleeve, said sleeve having a longitudinal axis generally parallel to such a fluid flow path;
   a mechanical valve actuating device, said device including a first cam member and a second cam member, said cam members disposed within said housing at opposite sides of said sleeve, each of said cam members including a rotatable drive element and a cam section, said rotatable drive element being rotatable about an axis of rotation which is transverse to and offset laterally from said longitudinal axis, said cam section being disposed beside said sleeve and eccentrically attached to the respective drive element for movement transverse to said sleeve along an acuate path as that drive element is rotated for pinching and releasing the sleeve; a hub element disposed at one side of said housing; means for rotating said hub, a first link having two ends, one end pivotably mounted to said drive element of said first cam member and one end pivotably mounted on said hub; and a second link having two ends, one end pivotably mounted to said drive element of said second cam member and one end pivotably mounted on said hub;
   whereby rotation of said hub drives the links which causes the cam members to rotate for pinching and releasing the sleeve.

14. The apparatus of claim 13 wherein said sleeve includes rigid cylindrical portions and a resilient flexible section therebetween, said cam sections being positioned to pinch said flexible section, and said rotatable portions of said cam members being of a construction and disposition to effect such transverse movement of said cam sections between extended positions for pinching said resilient flexible sleeve section and retracted portions clear of the profile of said rigid cylindrical portions to allow axial insertion and removal of said sleeve therebetween.

15. The apparatus of claim 14 wherein the width of each cam member decreases from the opposite ends to the center of said cam member.

16. The apparatus of claim 14 wherein said housing defines a generally cylindrical chamber and a transverse recess intersecting each side of said cylindrical chamber, said cam sections being retractable into said recesses, whereby said sleeve may be so removed from and inserted into said cylindrical chamber through said valve actuating device.

17. The apparatus of claim 13 wherein said cam members each comprise a top portion, a bottom portion, and a shank portion having opposite ends and a center, said top and bottom portions fixedly attached to the shank portion at opposite ends of the shank portion and rotatably mounted on said housing.

18. The apparatus of claim 17 wherein the periphery of the shank portion in cross section is generally teardrop shaped at the opposite ends and generally triangular at the center of the shank portion.

19. The apparatus of claim 13 further comprising:
   said hollow housing defining a central actuating chamber and circular wall portions at each end thereof;
   exterior sealing means adjacent each end of said sleeve, between said sleeve and said circular wall portions, for sealing the ends of said actuating chamber;
   said hub disposed in said transverse opening, and further sealing means disposed between said hub and said housing; and
   means for applying actuating fluid in said actuating chamber;
   whereby said valve may be actuated by such fluid in said actuating chamber and by said mechanical actuating device.

20. The apparatus of claim 19 wherein:
   said sleeve has a rigid annular portion proximate to each end thereof, each rigid annular portion being concentrically aligned in the respective circular wall portion; and
   each of said exterior sealing means is disposed between the respective rigid annular portion and circular wall portion for sealing the actuating chamber between the sleeve and the housing independently of any other portion of a system in which said pinch valve is used.

21. The apparatus of claim 13 wherein:
   said housing defines a threaded aperture proximate said hub; said means for rotating said hub is a lever which is fixedly attached to said hub; and
   a removable screw threaded into said aperture of said housing to prevent movement of said lever beyond a predetermined position.

22. The apparatus of claim 13 wherein:
   said means for rotating said hub is a lever which is releasedly attached to the hub; and a stop element on said housing in the path of said lever to prevent movement of said lever beyond a predetermined position.

23. An apparatus as in claim 13 wherein said links are pivotably mounted to said hub and said drive portions in a manner whereby said ends of each link move substantially colinearly with one another at the valve-open position of said cam sections, and each of said links is substantially at a dead-center position when said cam sections are at a valve-closed position.

24. An apparatus as in claim 23 wherein the paths of movement of the pivotable mounts of said links on said hub have a radius greater than the radii of the paths of movement of the pivotable mounts of said links on said drive portions.

* * * * *

UNITED STATES PATENT AND TRADEMARK OFFICE
CERTIFICATE OF CORRECTION

PATENT NO. : 4,682,755
DATED : July 28, 1987
INVENTOR(S) : Robert E. Bernstein et al.

It is certified that error appears in the above-identified patent and that said Letters Patent is hereby corrected as shown below:

Column 7, line 23, "imput" should read --input--.

Column 7, line 23-24, "vibration" should read --variation--.

Column 9, line 51, after "least" insert --one--.

Column 10, line 41, "as" should read --an--.

Column 11, line 54, "acuate" should read --arcuate--.

Signed and Sealed this

Fifth Day of April, 1988

Attest:

DONALD J. QUIGG

Attesting Officer

Commissioner of Patents and Trademarks